(12) United States Patent
Zhang et al.

(10) Patent No.: US 10,774,541 B2
(45) Date of Patent: Sep. 15, 2020

(54) HIGH STRENGTH STONE PLASTIC FLOOR AND MANUFACTURING METHOD THEREOF

(71) Applicant: Xiaoling Zhang, Jiangsu (CN)

(72) Inventors: Xiaoling Zhang, Jiangsu (CN); Zhiyuan Xiao, Jiangsu (CN)

(73) Assignee: Xiaoling Zhang, Jiangsu (CN)

( * ) Notice: Subject to any disclaimer, the term of this patent is extended or adjusted under 35 U.S.C. 154(b) by 7 days.

(21) Appl. No.: 15/121,394

(22) PCT Filed: Dec. 25, 2015

(86) PCT No.: PCT/CN2015/098956
§ 371 (c)(1),
(2) Date: Aug. 25, 2016

(87) PCT Pub. No.: WO2017/049795
PCT Pub. Date: Mar. 30, 2017

(65) Prior Publication Data
US 2017/0183878 A1  Jun. 29, 2017

(30) Foreign Application Priority Data

Sep. 25, 2015 (CN) .......................... 2015 1 0625017

(51) Int. Cl.
*B32B 7/02* (2019.01)
*E04F 15/10* (2006.01)
(Continued)

(52) U.S. Cl.
CPC .......... *E04F 15/105* (2013.01); *B29C 43/003* (2013.01); *B29C 43/24* (2013.01);
(Continued)

(58) Field of Classification Search
CPC ...... B32B 27/304; C08L 27/06; E04F 15/105; E04F 15/107; C08F 14/06; C08F 114/06;
(Continued)

(56) References Cited

U.S. PATENT DOCUMENTS 4,544,694 A   10/1985 Bower
6,933,043 B1 * 8/2005 Son .......................... B32B 27/08
                                                        428/213

(Continued)

FOREIGN PATENT DOCUMENTS

CN    103741930 A    4/2014
CN    103865208 A    6/2014
(Continued)

*Primary Examiner* — Prashant J Khatri
*Assistant Examiner* — Zachary M Davis
(74) *Attorney, Agent, or Firm* — Bayramoglu Law Offices LLC

(57) ABSTRACT

The invention provides a high strength stone plastic floor and manufacturing method thereof. The stone plastic floor comprises a PVC substrate and a surface layer on a surface of the PVC substrate. Compositions of PVC substrate comprise: PVC powder from 20 to 35 weight percent, calcium carbonate from 60 to 70 weight percent, stabilizer from 1 to 3 weight percent, flexibilizer from 1 to 3 weight percent, lubricants from 0.4 to 1 weight percent, and colorant from 0.4 to 1 weight percent. The high strength stone plastic floor does not contain plasticizer so environmental risks are completely avoided. The contractility is good. The high strength stone plastic floor is resistant to high temperature and direct sunlight. Compared with conventional stone plastic floor, lifespan of the present invention is prolonged. The PVC substrate of the floor can be combined with different layers and can integrate different advantages of other floors.

9 Claims, 1 Drawing Sheet

(51) Int. Cl.
*B29C 48/00* (2019.01)
*C04B 26/08* (2006.01)
*B29C 43/00* (2006.01)
*B29C 43/24* (2006.01)
*B32B 21/08* (2006.01)
*E04F 15/04* (2006.01)
*C04B 111/00* (2006.01)
*B29K 27/06* (2006.01)
*B29K 105/00* (2006.01)
*B29K 105/16* (2006.01)
*B29K 509/00* (2006.01)

(52) U.S. Cl.
CPC ...... *B29C 48/0011* (2019.02); *B29C 48/0021* (2019.02); *B29C 48/022* (2019.02); *B32B 7/02* (2013.01); *B32B 21/08* (2013.01); *C04B 26/08* (2013.01); *E04F 15/043* (2013.01); *E04F 15/10* (2013.01); *E04F 15/102* (2013.01); *E04F 15/107* (2013.01); *B29K 2027/06* (2013.01); *B29K 2105/0032* (2013.01); *B29K 2105/0038* (2013.01); *B29K 2105/0044* (2013.01); *B29K 2105/16* (2013.01); *B29K 2509/00* (2013.01); *B32B 2264/10* (2013.01); *B32B 2307/3065* (2013.01); *B32B 2471/00* (2013.01); *C04B 2111/00129* (2013.01)

(58) Field of Classification Search
CPC ......... C08F 214/06; C08K 3/01; C08K 3/013; C08K 3/26; C08K 2003/265
See application file for complete search history.

(56) References Cited

U.S. PATENT DOCUMENTS

| | | | |
|---|---|---|---|
| 2006/0062966 A1* | 3/2006 | Kang | B32B 5/022 428/156 |
| 2008/0242802 A1* | 10/2008 | Noguchi | C08F 290/04 525/239 |
| 2011/0167744 A1* | 7/2011 | Whispell | E04F 15/02 52/309.1 |
| 2015/0267025 A1* | 9/2015 | Fang | B32B 3/26 428/318.6 |
| 2016/0009060 A1* | 1/2016 | Toft | B32B 27/08 428/215 |
| 2016/0177579 A1 | 6/2016 | Fang | |
| 2016/0230399 A1 | 8/2016 | Zhang | |

FOREIGN PATENT DOCUMENTS

| | | | | |
|---|---|---|---|---|
| CN | 104110115 A | 10/2014 | | |
| CN | 104154586 A | 11/2014 | | |
| CN | 104403233 A | 3/2015 | | |
| CN | 105133818 A | 12/2015 | | |
| WO | WO-2010049530 A2 * | 5/2010 | ............ | B29B 7/007 |

* cited by examiner

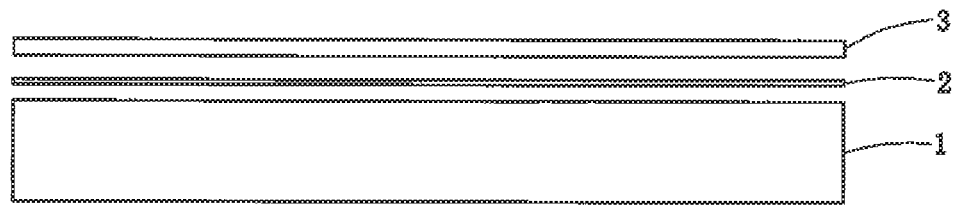

HIGH STRENGTH STONE PLASTIC FLOOR AND MANUFACTURING METHOD THEREOF

BACKGROUND OF THE INVENTION

1. Field of the Invention

The present invention relates to field of stone plastic floor, and more particularly to a high strength stone plastic floor and manufacturing method thereof.

2. Description of the Prior Art

Stone plastic floor is also known as stone plastic brick. The scientific name is "PVC sheet floor". It is a new high-quality ground decorative material developed by high technology and processed by hundreds of procedures. The solid substrate of high density and high-fiber reticulate structure are made of natural marble powder and the surface is covered with super wear-resistant polymer PVC wear-resistant layer. The product is super wear-resistant and has shiny but anti-skid surface with lifelike grains, which can be regarded as a model of new high technology material in $21^{st}$ century.

However, conventional stone plastic floor has the following disadvantages. First, it comprises plasticizer and has environmental risks. Second, the contractility is poor and it is easy to break. Third, it is non-resistant to high temperature and will soften under high temperature so it cannot be placed on the high-temperature geothermal ground or the ground directly exposed to the sunlight. Fourth, lifespan is short.

So there is a need to provide a stone plastic floor to overcome the defects of prior arts.

BRIEF SUMMARY OF THE INVENTION

The technical problem to be solved by the present invention is to provide a high strength stone plastic floor and manufacturing method thereof, the substrate of which is high-strength, resistant to high temperature and longevous.

In order to solve the above problems, the present invention provides a high strength stone plastic floor, comprising a PVC substrate and a surface layer on a surface of the PVC substrate. Compositions of PVC substrate comprise PVC powder from 20 to 35 weight percent, calcium carbonate from 60 to 70 weight percent, stabilizer from 1 to 3 weight percent, flexibilizer from 1 to 3 weight percent, lubricants from 0.4 to 1 weight percent, and colorant from 0.4 to 1 weight percent.

Further, the surface layer is color film layer and wear-resistant layer set successively on the PVC substrate.

Further, the thickness of PVC substrate is 2.0-8.0 mm; the thickness of color film is 0.05-0.09 mm; the thickness of wear-resistant layer is 0.07-1.0 mm.

Further, the surface layer is PVC wear-resistant layer.

Further, the surface layer is fire-proof board layer.

Further, the surface layer is wood veneer layer.

The present invention also provides manufacturing method of the high strength stone plastic floor, comprising steps of: providing materials to manufacture PVC substrate: PVC powder from 20 to 35 weight percent, calcium carbonate from 60 to 70 weight percent, stabilizer from 1 to 3 weight percent, flexibilizer from 1 to 3 weight percent, lubricants from 0.4 to 1 weight percent, colorant from 0.4 to 1 weight percent; mixing and stirring the above materials; extruding and calendaring the above materials to get sheet by extruder; cooling to get the PVC substrate; laminating the PVC substrate and surface layer to form the stone plastic floor.

Further, in stirring step, the speed of stirring is 1000-3000 r/min and time of stirring is 4-8 minutes.

Further, in the extrusion step, the temperature is 187-210° C.

The present invention has the following beneficial effects. (1) The high strength stone plastic floor does not contain plasticizer so environmental risks are avoided completed. (2) The contractility is good, wherein the floor contraction percentage is controlled within 0.06%. (3) The high strength stone plastic floor is resistant to high temperature and direct sunlight. Strength can be kept under high temperature. (4) Compared with conventional stone plastic floor, lifespan of the present invention is prolonged. (5) The PVC substrate of the floor can be combined with different layers and can integrate different advantages of other floors.

BRIEF DESCRIPTION OF THE DRAWINGS

FIG. 1 is a structural schematic view of one embodiment of a high strength stone plastic floor of the present invention.

Reference numerals: 1. PVC substrate 2. Color film layer 3. Wear-resistant layer.

DETAILED DESCRIPTION OF THE PREFERRED EMBODIMENTS

The following text will further describe the embodiment of the present invention and manufacturing method thereof with reference to the accompanying drawings.

Refer to FIG. 1, the present invention provides a high strength stone plastic floor, comprising a PVC substrate 1 and a surface layer on the surface of the PVC substrate 1. In the present embodiment, the surface layer is color film layer 2 and wear-resistant layer 3 set successively on the PVC substrate 1. In other embodiments of the present invention, the surface can be LUT layer, fire-proof board layer and wood veneer layer. All layers in the prior art which can be set on the PVC substrate 1 can be used as surface layer of the present invention. Therefore, the PVC substrate of the present invention can be combined with different surface layers. The high strength stone plastic floor of the present invention can integrate different advantages of other floors to realize the superposition of advantages.

Refer to TABLE 1, which shows compositions of the PVC substrate. In the TABLE 1, all components are well known to technicians in the art. Technicians can choose from available materials so there is no more tautology.

TABLE 1

| Materials | Weight percent |
| --- | --- |
| PVC powder | 20~35% |
| Calcium carbonate | 60~70% |
| Stabilizer | 1~3% |
| Flexibilizer | 1~3% |
| Lubricants | 0.4~1% |
| Colorant | 0.4~1% |

The thickness of the PVC substrate is 2.0-8.0 mm. In the present embodiment, the surface layer is color film layer 2 and wear-resistant layer 3 set successively on the PVC substrate 1 and the thickness of each layer are shown in TABLE 2.

TABLE 2

| Materials | Thickness |
|---|---|
| PVC substrate | 2~8 mm |
| Color film | 0.05~0.09 mm |
| Wear-resistant layer | 0.07~1 mm |

The manufacturing method of the present invention comprises the following steps.
(1) providing materials to manufacture PVC substrate: PVC powder from 20 to 35 weight percent, calcium carbonate from 60 to 70 weight percent, stabilizer from 1 to 3 weight percent, flexibilizer from 1 to 3 weight percent, lubricants from 0.4 to 1 weight percent, colorant from 0.4 to 1 weight percent;
(2) mixing and stirring the materials, the stirring speed is 1000-3000 r/min and the time is 4-8 minutes;
(3) extruding and calendaring the above materials to get sheet by extruder by the extruder after stirring with the temperature of 187-210° C.;
(4) cooling to get the PVC substrate and cutting into required sizes;
(5) laminating the PVC substrate and the surface layer to form stone plastic floor. Technicians can acquire the laminating method from prior art so there is no more tautology.

The performance test between the high strength stone plastic floor of the present invention and the stone plastic floor in the prior art is conducted and comparison of results are shown in TABLE 3.

TABLE 3

| Text content | EN649 standard | Stone plastic floor in the prior art | High strength stone plastic floor of the present invention |
|---|---|---|---|
| Transverse contraction | ≤0.25% | 0.10% | 0.05% |
| Longitudinal contraction | ≤0.25% | 0.15% | 0.03% |
| Hardness (Shore durometer test) | | 60° Under high temperature of 80□, 38° | 72° Under high temperature of 80□, 65° |

The present invention of high strength stone plastic floor adopts the PVC substrate comprised by the above compositions so the stone plastic floor has the following beneficial effects. (1) The high strength stone plastic floor does not contain plasticizer so environmental risks are avoided completed. (2) The contractility is good, wherein the floor contraction percentage is controlled within 0.06%. (3) It is resistant to high temperature. The conventional stone plastic floor will soften under high temperature so it cannot be placed on the high temperature geothermal ground or the ground directly exposed to the sunlight. The high strength stone plastic floor of the present invention completely overcomes the defect and can keep hardness under high temperature. The hardness can reach 65° under high temperature of 80° C., 5° harder than that of the conventional stone plastic floor at room temperature. It is resistant to extreme weather conditions (including direct sunlight). (4) Lifespan is longer than the conventional stone plastic floor. (5) The PVC substrate of the stone plastic floor can be combined with different layers and can integrate different advantages of other floors.

The above is just preferred embodiment of the present invention. It should be noted that any technicians in the art may improve and modify the embodiment of the present invention within the spirit and scope of the appended claims, but these improvement and modification belong to the protection scope of the present invention.

What is claimed is:

1. A high strength stone plastic floor comprising a PVC substrate and a surface layer on a surface of the PVC substrate; wherein compositions of the PVC substrate comprise: PVC powder from 20 to 35 weight percent, calcium carbonate from 60 to 70 weight percent, stabilizer from 1 to 3 weight percent, flexibilizer from 1 to 3 weight percent, lubricants from 0.4 to 1 weight percent, and colorant from 0.4 to 1 weight percent, wherein the high strength stone plastic floor does not contain plasticizer.

2. The high strength stone plastic floor as claimed in claim 1, wherein the surface layer comprises two layers: a color film layer and a wear-resistant layer set successively on the PVC substrate.

3. The high strength stone plastic floor as claimed in claim 2, wherein the thickness of the PVC substrate is 2.0-8.0 mm; the thickness of the color film is 0.05-0.09 mm; the thickness of the wear-resistant layer is 0.07-1.0 mm.

4. The high strength stone plastic floor as claimed in claim 1, wherein the surface layer is a PVC wear-resistant layer.

5. The high strength stone plastic floor as claimed in claim 1, wherein the surface layer is a fire-proof board layer.

6. The high strength stone plastic floor as claimed in claim 1, wherein the surface layer is a wood veneer layer.

7. A manufacturing method of the high strength stone plastic floor as claimed in claim 1 comprises the following steps:
providing materials to manufacture PVC substrate: PVC powder from 20 to 35 weight percent, calcium carbonate from 60 to 70 weight percent, stabilizer from 1 to 3 weight percent, flexibilizer from 1 to 3 weight percent, lubricants from 0.4 to 1 weight percent, colorant from 0.4 to 1 weight percent;
mixing and stirring the above materials;
extruding and calendaring the above materials to get sheet by extruder;
cooling to get the PVC substrate;
laminating the PVC substrate and surface layer to form the stone plastic floor.

8. The manufacturing method of the high strength stone plastic floor as claimed in claim 7, wherein, in the stirring step, the speed of stirring is 1000-3000 r/min and time of stirring is 4-8 minutes.

9. The manufacturing method of the high strength stone plastic floor as claimed in claim 7, wherein, in the extruding step, the temperature is 187-210° C.

* * * * *